Feb. 24, 1970  R. MARIANI  3,497,738
A.C. MOTOR
Filed March 2, 1967  3 Sheets-Sheet 1
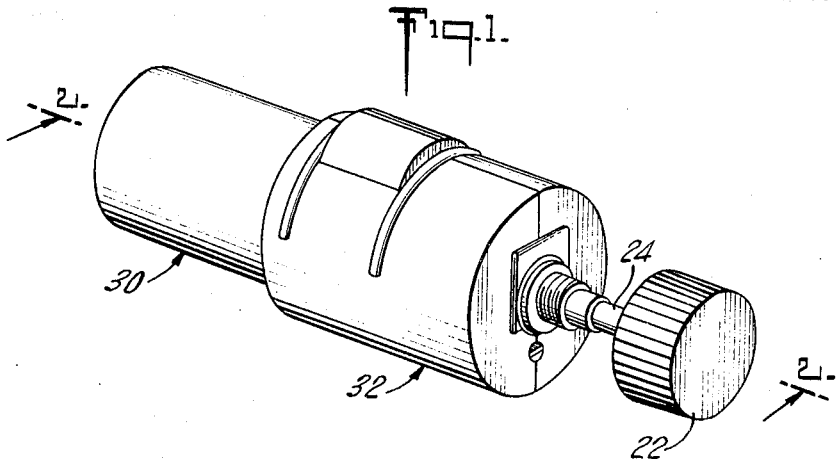
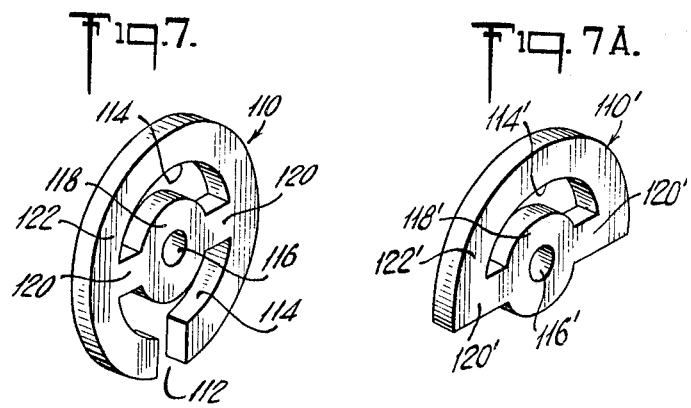
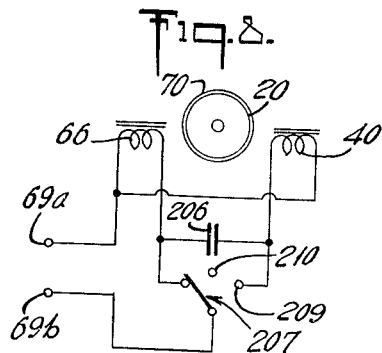
INVENTOR
REMO MARIANI
BY
Nolte & Nolte
ATTORNEYS

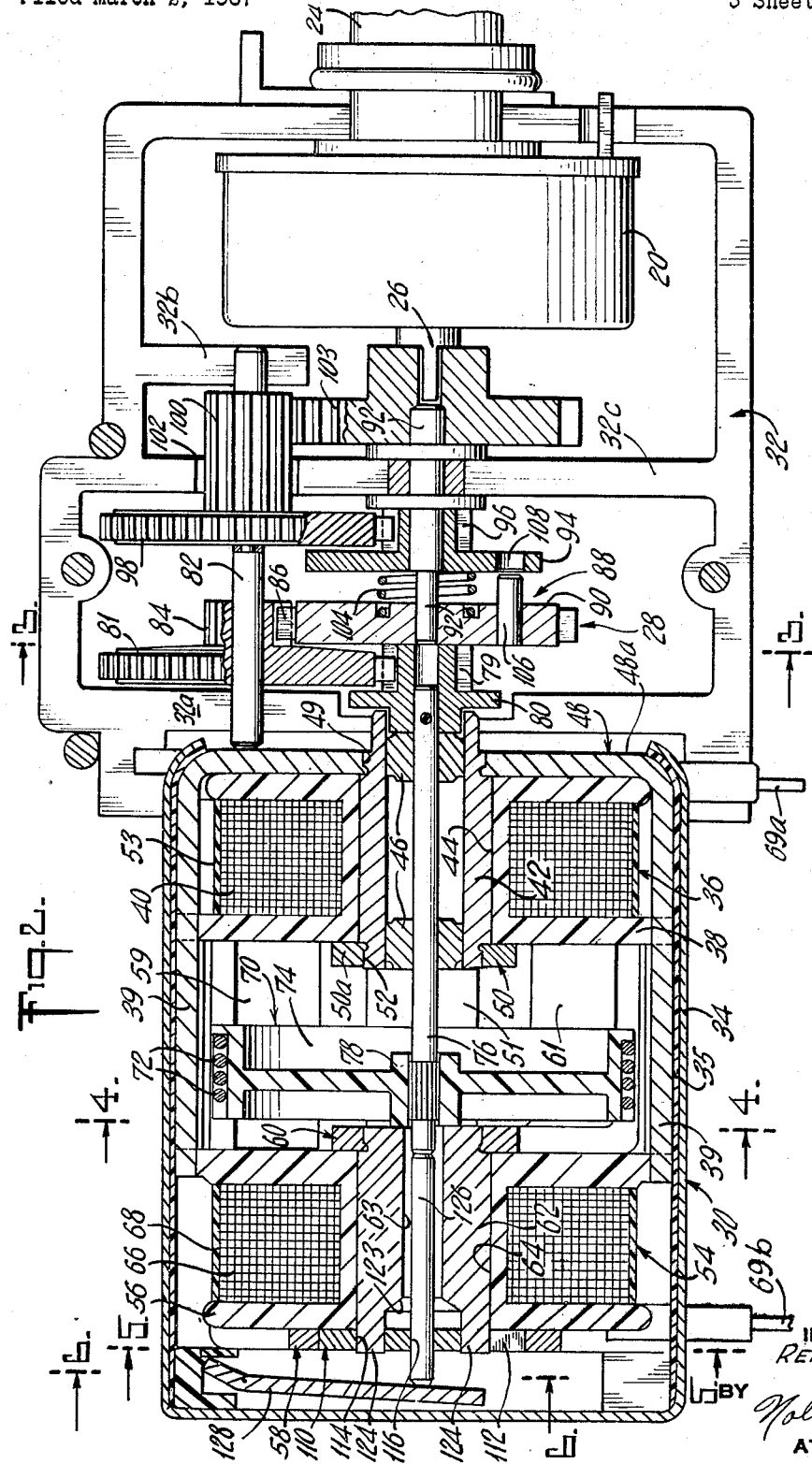

Feb. 24, 1970  R. MARIANI  3,497,738
A.C. MOTOR
Filed March 2, 1967  3 Sheets-Sheet 3
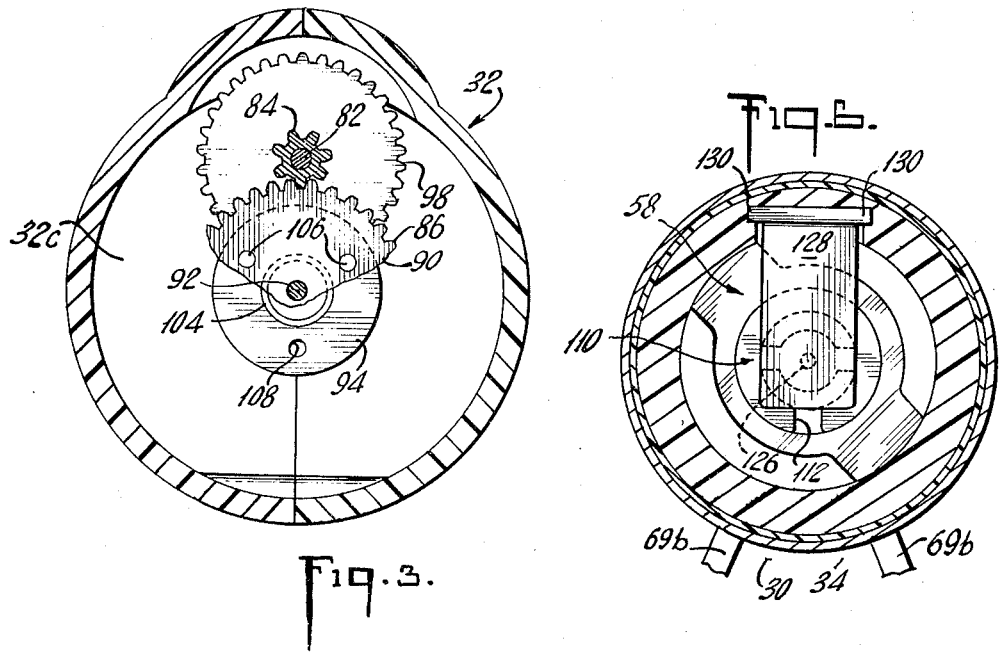
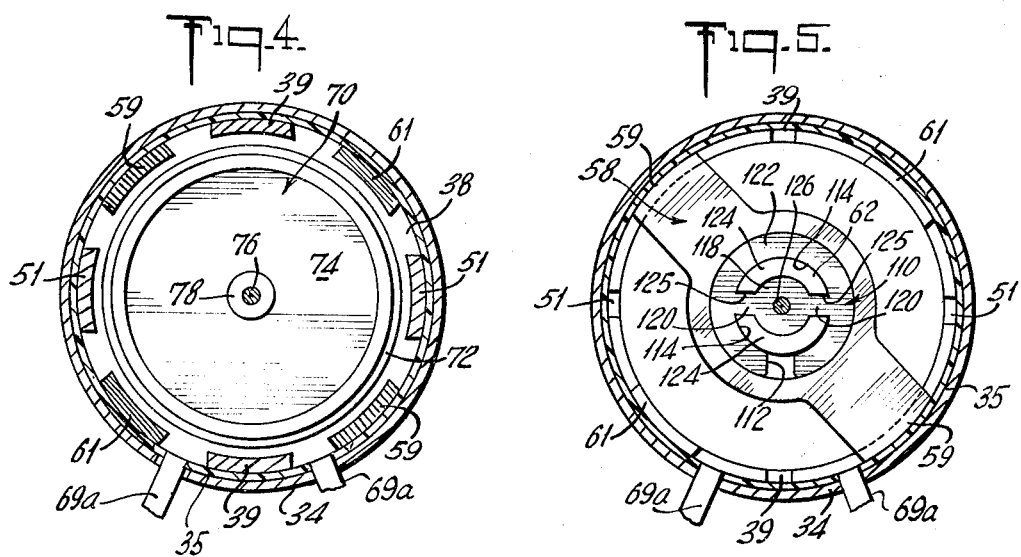
INVENTOR
REMO MARIANI
BY
Nolte & Nolte
ATTORNEYS United States Patent Office 3,497,738
Patented Feb. 24, 1970

3,497,738
A.C. MOTOR
Remo Mariani, Berkeley Heights, N.J., assignor to Dale Electronics, Inc., Columbus, Nebr., a corporation of Nebraska
Filed Mar. 2, 1967, Ser. No. 619,997
Int. Cl. H02k 7/116
U.S. Cl. 310—78                                       9 Claims

ABSTRACT OF THE DISCLOSURE

Means are provided for manually or remotely rotating a shaft in either of two angularly opposite directions. A hysteresis motor is selectively coupled to the shaft to be driven by means of a clutch arrangement. Heat loss and noise are reduced by the inclusion of a shading ring. An external actuating arm is magnetically attracted to the core of one of the two stators that are positioned on either side of the axially moveable hysteresis motor. The actuating arm causes axial movement of the rotating hysteresis motor shaft when the motor is energized whereby the clutch arrangement is coupled to the shaft that is to be driven.

---

This invention relates to an improved motor and gear train assembly and in particular to a miniaturized motor and speed reduction gear train assembly for use in remotely positioning a shaft that is otherwise manually displaceable.

This invention embodies features rendering it especially useful in remotely positioning a potentiometer shaft, for example, as may be used in the speaker balance control of a stereophonic sound reproducing system. While the invention will be described in connection with a potentiometer shaft, it should be clearly understood that the invention is not limited thereto since there are many other applications of the improved structure.

U.S. Patent No. 3,234,418 issued to P. M. Tomaro, Jr. on Feb. 8, 1966 and U.S. Patent No. 3,241,385 issued to P.M. Tomaro, Jr. on Mar. 22, 1966 are examples of the class of motor and clutched gear train respectively to which the present invention is directed. As will be brought out more fully hereinafter, the present invention provides important improvements over the prior art represented by the two aforementioned patents.

It is an object of this invention to provide improved means for axially displacing the rotor shaft of a motor used in the manner described above.

It is another object of this invention to provide an improved clutch arrangement for use with apparatus adapted to selectively rotate the shaft of a potentiometer, for example.

A specific object of this invention is to provide pivotal rotor displacement means that is disposed within the flux path of the synchronous motor.

It is another object of this invention to provide a simplified motor having an output gear that is continuously in engagement with a gear train and wherein there is provided clutch means to selectively couple the output gear to the shaft that is to be driven.

It is another object of this invention to provide a clutched gear train wherein the shaft that is to be driven may be manually rotated when the clutch elements are not in engagement.

A particular object of this invention is to provide a shading ring cooperatively associated with the core piece of a stator in order to permit improved actuation of a hysteresis motor.

Still another object is to provide a magnetically actuated rotor displacement member that is external to and cooperatively associated with the stator core and rotor shaft of a hysteresis motor.

These and other features, objects and advantages of the invention will in part be pointed out with particularity and will in part become obvious from the following more detailed description of the invention taken in conjunction with the accompanying drawing which forms an integral part thereof. In the various figures of the drawing, like reference characters designate like parts.

In the drawings:

FIG. 1 is a perspective view of a motor and gear train, which in combination with a potentiometer comprise the present invention;

FIG. 2 is a longitudinal sectional view taken along line 2—2 of FIG. 1;

FIG. 3 is a transverse sectional view taken along line 3—3 of FIG. 2;

FIG. 4 is a transverse sectional view taken along line 4—4 of FIG. 2;

FIG. 5 is a transverse sectional view taken along line 5—5 of FIG. 2;

FIG. 6 is a transverse sectional view taken along line 6—6 of FIG. 2;

FIG. 7 is a perspective view of the shading ring used with the present invention; and FIG. 8 is a schematic diagram of a circuit which may be used to energize the coils of the motor.

Referring now to the drawings, and in particular, to FIG. 1, it will be seen that the invention includes apparatus to manually rotate the shaft of a potentiometer 20. A knob 22 is coupled to potentiometer shaft 24, so that the wiper arm of the potentiometer may be angularly displaced when so desired. Although not specifically illustrated and described in detail, it is to be understood that the potentiometer includes terminal means, a resistance element connected to the terminal means and collector and take-off apparatus, all of which is of the type conventional in the art. The potentiometer includes a wiper element arranged to traverse the resistance track between angular limits defined by internal stop members.

As shown in FIG. 2 the potentiometer shaft includes an extension 26 that is coupled to a gear train generally designated as 28. Motor 30 is also connected to the gear train in a manner that permits uncoupling of the motor when it is desired to manually actuate the potentiometer shaft and which permits coupling when the motor is to be used for remote positioning of the potentiometer shaft. The potentiometer, the gear train and the motor are affixed to a housing 32, that may be suitably mounted on a support panel (not shown).

Referring now to the motor section 30, a cup-shaped metallic housing 34 which includes insulation means 35 is provided for the internal components. A first stator section 36 includes a bobbin 38 and a length of conductor 40 wound on the bobbin. A hollow, magnetizable core 42 is positioned within the central bore 44 of the bobbin and includes bearing members 46. Two U-shaped pole pieces also form part of the first stator section. The first pole piece 48 has the transverse connecting web 48a thereof positioned against the right hand end face of the bobbin 38. The two spaced, parallel legs 39 of the first pole piece are positioned on the periphery of the bobbin and are disposed in notches therein in order to maintain the angular position of the pole piece legs with respect to the windings. In addition, the pole piece connecting web has a central opening 49 in which is received an extension of core member 42. The second U-shaped pole piece 50 has its central, connecting web 50a positioned against the left hand end face the bobbin 38 with the spaced parallel legs 51 of the second pole piece extending in the same axial direction as the legs first pole piece. The second pole piece also has a central opening 52 in which is received another extension at the opposite end of core member 42. It will be seen in FIG. 4 of the drawings that the two pole pieces are 90 degrees out of phase with each other. The first stator section is completed by a length of insulating tape 53 that is wrapped around the coil.

Second stator section 54 is also comprised of a bobbin 56 and two U-shaped pole pieces 58 and 60. A hollow, magnetic core 62 having a central bore 63 is secured within a central bore 64 of the bobbin and a length of wire 66 is wound around the body of the bobbin. The two pole pieces 58 and 60 of the second stator section, face in the direction opposite to the pole pieces of the first stator section. That is, the central connecting web of pole piece 58 is positioned against the left hand end face of the bobbin and the central connecting web of pole piece 60 is positioned against the right hand end face of the bobbin. The spaced, parallel legs 59 and 61 of pole pieces 58 and 60 respectively are out of phase with each other by 90 degrees and in the assembled condition are out of phase by 45 degrees with the pole pieces in the first stator section. The legs of pole pieces 58 and 60 are disposed in notches in the left hand end face of the first stator section bobbin as well as the right hand end face of the second stator section bobbin, while the ends of pole pieces 48 and 50 of the first stator section are disposed in notches in right hand end face of the second stator section bobbin as well as the left hand end face of the first stator section bobbin. Thus, the angular relationship of all four pole pieces are accurately maintained with respect to each other and with respect to the windings. The pole pieces 58 and 60 have central apertures which receive extensions of core 62 for mounting purposes. A length of insulating tape 68 is wrapped around coil. Terminals 69a and 69b electrically connected to the windings of the first and second stator sections respectively are adapted to be connected to a suitable source of AC power (not shown).

An axially moveable rotor member 70 is disposed within the housing of motor 30 intermediate the first and second stator sections. The rotor includes several turns of wire 72 made of a high hysteresis material wrapped around the outer circumference of a wheel-like plastic support member 74. A shaft 76 is rigidly secured to the central hub 78 of the support member. As may be seen in FIG. 2, shaft 76 extends slightly into the central bore 63 of the core 62 in the second stator section 54 and at its opposite end passes through bearings 46 in the core member 42 of the first stator section 36. The right hand end of shaft 76 also has a pinion 79 rigidly secured thereto, the pinion including an integral enlarged flange portion 80, the purpose of which will be explained subsequently.

Pinion 79 is the first member of gear train 28. Pinion 79 is in meshing engagement with gear 81 mounted on shaft 82, the ends of which are fixed in transverse wall portions 32a and 32b of housing 32. In addition to being rotatably disposed on shaft 82, gear 81 is also axially slidable thereon. Gear 81 includes an integral pinion 84 that is in meshing engagement with a gear 86.

Clutch assembly 88 is integral with the gear train 28 and is comprised of a driving plate 90 that is formed integrally with gear 86. The combination driving plate 90 and gear 86 are loosely mounted on shaft 92 that is journaled in a transverse wall 32c of housing 32 in coaxial confronting relationship with shaft 76. The driven plate 94 of the clutch assembly includes an integrally formed pinion gear 96, the combination being loosely mounted on an enlarged portion of shaft 92.

Gear 96 is in meshing engagement with gear 98 loosely mounted on shaft 82. Integrally formed with gear 98 is another gear 100 that passes through a suitable opening 102 in a transverse wall 32c of the housing. Gear 100 is, in turn, in meshing engagement with gear 103, the center bore of which receives the right hand end of shaft 92 and left hand end of potentiometer extension shaft 26.

The hub of gear 103 is slotted to receive the flattened end of the potentiometer extension so that when the motor 30 is energized rotation of gear 103, through gear train 28 and clutch assembly 88, will cause rotation of the potentiometer shaft in the desired direction.

Referring once again to the clutch assembly, it will be seen that a compression spring 104 is disposed about the left hand end of shaft 92 and is positioned intermediate the opposed faces of driving plate 90 and driven plate 94. The spring normally biases the two plates apart. However, as will be explained more fully hereinafter, when the motor is energized driving plate 90 is urged axially in the direction of driven plate 94. Pins 106 extending axially from the right hand face of driving plate 90 are adapted to engage apertures 108 in the driven plate. Thus, when the motor is energized the gear train will be completed through the clutch plates and the motor will rotate the potentiometer shaft. Conversely, when the motor is de-energized, the compression spring 104 will cause the pins 106 to be spaced from apertures 108, the gear train will be broken and the potentiometer shaft may then be manually rotated by knob 22.

Driving plate 90 is in abutment with the end face of pinion 79 and is axially shifted by means of the axial movement of rotor 70 when the motor is energized. Flange 80 which is integral with gear 79 pinned to shaft 76 is axially displaced to the right when the motor is energized. The flange bears against the left hand face of gear 81 driving that gear as well as gear 84 to the right. It will be noted that the right hand face of gear 81 is beveled at the periphery thereof so that when this gear moves to the right it will abut the left hand face of driving plate 90 and urge the driving plate to the right, thereby compressing the spring and engaging pins 106 in the apertures 108. Because the right hand face of gear 81 is beveled, there will be only a minimum contact between the face of gear 81 and the left hand face of the driving plate 90, thereby minimizing frictional losses.

Referring now to FIGS. 2, 5, and 7, it will be seen that a copper shading ring is positioned, at assembly, in the plane of the transverse connecting web of pole piece 58. The shading ring is substantially disc shaped and is provided with a notch 112 on the edge thereof, two arcuate cut outs 114 and a central aperture 116. The arcuate cut outs and central aperture are defined by a central hub 118 and two opposed leg portions 120 that connect the hub 118 with the ring like discontinuous periphery 122. The left hand end of core member 62 is provided with a recess 123 that defines an annular lip 124. The shading ring is mounted on the core by inserting the annular lip of the core into the arcuate cut outs in the shading ring. The left hand end of the core includes a pair of opposed axially directed slots that define arcuate portions 125 arranged to be positioned in the arcuate cut outs 114 of the shading ring. The legs 120 of the shading ring are positioned in the core slots. In addition, a shifting rod 126 is disposed in aperture 116 of the shading ring and extends into the central bore 63 of the core 62. Rod 126 abuts the left hand end of shaft 76 that is integral with the rotor 70. A flapper arm 128 made of a magnetizable material such as cold rolled steel is pivotally mounted with respect to the casing by means of transverse tabs 130 formed at one end thereof. The opposite end of the flapper arm abuts the left hand end of rod 126. When the motor is energized, the flapper arm 128 will be magnetically pulled in, that is moved to the right as shown in FIG. 2, thereby axially displacing rod 126 to the right. In addition to having a rotary force applied thereto because of energization of the coils, rotor member 70 will be axially displaced to the right thereby compressing spring 104, axially displacing gears 79, 81, 84 and 86 to the right and engaging the driving and driven clutch plates 90 and 94 respectively. In this manner the potentiometer shaft 26 is coupled to the motor shaft 76. When the motor is de-energized the magnetic forces are removed and the compression spring 104 separates the driving clutch plate from the driven clutch plate. Gears 86, 84, 81 and 79 are moved to the left by the compression spring, thereby displacing the rotor and the rod 126 to the left to their original position as shown in FIG. 2 of the drawings. With the clutch uncoupled, the potentiometer shaft may be rotated by means of knob 22. In the manual mode of operation, gears 102, 100, 98 and 96 are rotated but since the clutch mechanism is uncoupled, there will be no rotational force applied to the remainder of the gear train.

The electrical control circuit which determines the direction of rotation of the motor is illustrated in FIG. 8. Alternating current is applied to terminals 69a and 69b. Capacitor 206 delays the voltage applied to one coil with respect to the voltage applied to the other coil. A three position switch 207 is used to reverse the direction of the motor. With switch 207 in the position shown in FIG. 8 the voltage is applied directly to coil 66 while the delayed voltage is applied to coil 40. The rotor and the potentiometer shaft coupled thereto will be angularly displaced in a first direction in addition to the axial displacement of the rotor shaft. If switch 207 is moved to contact 209 the voltage applied to coil 66 is delayed with respect to coil 40, in which case the rotor shaft and potentiometer shaft will be angularly displaced in a second opposite direction. However, the rotor shaft will be axially displaced in the same axial direction as the first described switch condition in order to engage the clutch plates as described above. The motor may be turned off by placing switch 207 at position 210 in which case there will be no voltage across the coils and the compression spring will urge the rotor shaft in a second, opposite axial direction.

The invention described hereinbefore provides several important advantages over the prior art devices. With regard to the flapper arm it should be noted that the structure disclosed provides a complete flux path. The flapper arm bridges the gap between the pole piece and the core member. When the motor is energized and the flapper arm is magnetically pulled in, there will be metal-to-metal contact between the flapper arm and the pole piece as well as between the flapper arm and the core member. Because there is no air gap between the flapper arm and the core member, when the motor is energized, the heat loss that is normally present in AC motors of this type is minimized. Also since the flapper arm is maintained in engagement with the shifting rod and the shifting rod abuts the rotor shaft there is no lost motion either when the motor is energized or de-energized.

An additional point of interest with regard to this aspect of the invention is that the shifting rod may be eliminated. When this is done the rotor shaft is extended by a length equal to the length of the shifting rod. Contact is maintained between the rotor shaft and the flapper arm as before. In addition to eliminating one part the advantageous feature of having the rotor actuating means external of the stator section is retained.

The shading ring used in this invention has several important functions. The shading ring is fabricated from a highly conductive, non-magnetic material such as copper, brass, etc. A.C. motors of this type normally have an inherent hum or chatter. The use of the shading ring substantially eliminates this undesirable characteristic. The shading ring is provided with a slot that defines a discontinuous material surface. The function of the slot is to assure that, electrically, the shading ring surrounds approximately one-half of the core only. The shading ring provides a more constant flux pattern. In addition the voltage generated in the ring during certain portions of the A.C. cycle produces a magnetic field strong enough to hold the flapper arm and overcomes the normal tendency of the flapper arm to push away. The shading ring also acts to improve the starting characteristics of the motor.

The clutch arrangement described herein is advantageous over the construction shown in U.S. Patent No. 3,241,385 since the gears are in constant mesh and the unit is uncoupled by displacement of one of the clutch plates. This also permits the gear train to be made more compactly.

There has been disclosed heretofore the best embodiment of the invention presently contemplated. It is to be understood however that various changes and modifications may be made by those skilled in the art without departing from the spirit of the invention.

FIG. 7a is a perspective view of an alternative shading ring which may be used with this invention.

FIG. 7a illustrates an alternate and preferred form of a copper shading ring. Functionally the FIG. 7a embodiment is similarly as that shown in FIG. 7. However, a portion of the periphery of the ring has been removed. Ring 110' is now comprised of a body portion having an arcuate cut out 114' and a central aperture 116'. The arcuate cut out and the central aperture are defined by a central hub 118' and two opposed leg portions 120' that connect the hub with the ringlike periphery 122'. Functionally then the shading ring may be said to be C-shaped with the opposed leg portions defining a D. In the preferred embodiment the shading ring is assembled to the end of the core as previously defined.

What is claimed is:
1. A bidirectional electric motor assembly comprising:
 (a) first and second stators coaxially spaced from each other, each of said stators including a coil form having an axial bore, a conductor wound on said coil form and adapted to be connected to an A.C. power source, and at least two pole pieces positioned in proximity to said coil and extending substantially parallel to the axis of the bore of said coil form;
 (b) a hollow, magnetizable core positioned within the bore of each of said stators, and at least one axially shiftable rod in the bore of said second stator core;
 (c) a rotor coaxially positioned intermediate said first and second stators and having an output shaft coaxial with and extending through the bore of at least said first stator, and a gear secured to said shaft proximate the opposite side of said first stator, said rotor being angularly and axially displaceable upon energization of said conductors; and
 (d) an actuator positioned externally of said second stator and within the flux path of said second stator pole piece and said second stator core, said actuator having a magnetizable portion adapted to be attracted to said second stator core when said conductors are energized, said rotor shaft being responsive to the movement of said actuator and engaged by said axially shiftable rod when said actuator is attracted to said second stator core thereby causing said rotor to be axially displaced in a predetermined direction.

2. The apparatus in accordance with claim 1, including spring means normally biasing said rotor shaft axially in a second direction opposite said first direction.

3. The apparatus in accordance with claim 1, including a shading member positioned in the magnetic field of said second stator defined by said pole piece and said core when said conductors are energized.

4. The apparatus in accordance with claim 1, wherein said shiftable rod has one end thereof in abutment with said rotor shaft, the opposite end of said rod being in abutment with said actuator.

5. The apparatus in accordance with claim 1, including a shading member positioned in the magnetic field defined by said second stator pole piece and said second stator core, when said conductor is energized, said shading ring being a substantially C-shaped ring and mounted on said core, said ring having a transverse central web whereby when said conductor is energized said ring, in an electrical sense, only partially surrounds said core.

6. The apparatus in accordance with claim 1, wherein said actuator is a flapper plate positioned proximate one end of said second stator, said flapper plate having first and second portions disposed adjacent said second stator pole piece and said second stator core, respectively, at least said second section being magnetizable, there being further included pivot means integral with said flapper plate first portion, said second portion being movable into abutment with said core upon energization of said coil.

7. A bidirectional electric motor and gear assembly comprising:
(a) first and second stators coaxially spaced from each other, each said stator including a coil form having an axial bore, a conductor wound on said coil form and adapted to be connected to an A.C. power source and at least two pole pieces positioned in proximity to said coil and extending substantially parallel to the axis of the bore of said coil form;
(b) a hollow, magnetizable core positioned within the bore of each of said stators and at least one axially shiftable rod in the bore of said second stator core;
(c) a rotor coaxially positioned intermediate said first and second stators and having an output shaft coaxial with and extending through the bore of at least said first stator, and a gear secured to said shaft proximate the opposite side of said first stator, said rotor being angularly and axially displaceable upon energization of said conductors;
(d) an actuator positioned externally of said second stator and within the flux path of said second stator pole piece and said second stator core, said actuator having a magnetizable portion adapted to be attracted to said second stator core when said conductors are energized, said rotor shaft being responsive to the movement of said actuator and engaged by said axially shiftable rod when said actuator is attracted to said second stator core thereby causing said rotor to be axially displaced in a predetermined direction;
(e) a driven shaft having a gear rigidly secured thereto;
(f) a gear train adapted to meshingly connect said rotor shaft gear and said driven shaft gear only when said coils are energized; and
(g) clutch means including a driving plate coupled to one member of said gear train and responsive to the axial displacement of said rotor shaft and a driven plate coupled to said driven gear, said driving and driven clutch plates being coupled to each other when said rotor is displaced in said predetermined direction.

8. The apparatus in accordance with claim 7, including a shading member positioned in the magnetic field defined by said second stator pole piece and said second stator core when said conductors are energized.

9. The apparatus in accordance with claim 7, wherein said driving clutch plate is comprised of a support member having a plurality of pins extending axially therefrom and said driven clutch is comprised of a support member having a plurality of apertures adapted to receive said pins when said plates are coupled to each other.

References Cited

UNITED STATES PATENTS

| | | | |
|---|---|---|---|
| 513,895 | 1/1894 | Dewey | 310—78 X |
| 1,956,041 | 4/1934 | Naul | 310—78 X |
| 2,164,633 | 7/1939 | Barrett. | |
| 2,267,114 | 12/1941 | Lear et al. | 310—78 X |
| 2,305,963 | 12/1942 | Hansen et al. | 310—164 |
| 2,334,040 | 11/1943 | Schellens | 310—164 |
| 2,412,461 | 12/1946 | Macintyre | 310—164 |
| 2,670,449 | 2/1954 | Brice. | |
| 3,052,828 | 9/1962 | Phinizy | 310—23 X |
| 3,092,743 | 6/1963 | Van Utt et al. | 310—164 X |
| 3,205,383 | 9/1965 | Hurst. | |
| 3,219,862 | 11/1965 | Kieffert | 310—257 X |
| 3,241,385 | 3/1966 | Tomaro | 74—354 |
| 3,325,660 | 6/1967 | Boyer | 310—75 |

MILTON O. HIRSCHFIELD, Primary Examiner

M. O. BUDD, Assistant Examiner

U.S. Cl. X.R.

74—352; 310—98, 164